United States Patent
Miller et al.

(10) Patent No.: US 11,015,107 B2
(45) Date of Patent: May 25, 2021

(54) METHODS OF CLEANING INVERT EMULSION DRILLING FLUIDS

(71) Applicant: Halliburton Energy Services, Inc., Houston, TX (US)

(72) Inventors: Jeffrey J. Miller, Spring, TX (US); Yerzhan Ayapbergenov, Houston, TX (US); Katerina V. Newman, Houston, TX (US); Jonathan Walker, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 305 days.

(21) Appl. No.: 15/559,095

(22) PCT Filed: Apr. 14, 2015

(86) PCT No.: PCT/US2015/025806
§ 371 (c)(1),
(2) Date: Sep. 18, 2017

(87) PCT Pub. No.: WO2016/167751
PCT Pub. Date: Oct. 20, 2016

(65) Prior Publication Data
US 2018/0244973 A1    Aug. 30, 2018

(51) Int. Cl.
| | | |
|---|---|---|
| C09K 8/36 | (2006.01) | |
| E21B 21/06 | (2006.01) | |
| B01L 3/14 | (2006.01) | |
| B01D 5/00 | (2006.01) | |
| B01D 21/26 | (2006.01) | |
| B01D 21/28 | (2006.01) | |

(52) U.S. Cl.
CPC ............... *C09K 8/36* (2013.01); *B01D 5/006* (2013.01); *B01D 21/262* (2013.01); *B01D 21/283* (2013.01); *B01L 3/14* (2013.01); *E21B 21/065* (2013.01); *E21B 21/066* (2013.01); *E21B 21/068* (2013.01); *C09K 2208/08* (2013.01); *C09K 2208/26* (2013.01)

(58) Field of Classification Search
CPC .............................. C09K 8/36; E21B 21/065
USPC ........................................................ 175/66
See application file for complete search history.

(56) References Cited

U.S. PATENT DOCUMENTS

| | | | |
|---|---|---|---|
| 4,725,362 A | 2/1988 | Dugat | |
| 7,939,470 B1 * | 5/2011 | Wagle | C09K 8/36 507/129 |

(Continued)

OTHER PUBLICATIONS

International Search Report and Written Opinion issued in corresponding application No. PCT/US2015/025806 dated Nov. 23, 2015, 19 pgs.

*Primary Examiner* — Crystal J Miller
*Assistant Examiner* — Ashish K Varma
(74) *Attorney, Agent, or Firm* — Chamberlain Hrdlicka

(57) ABSTRACT

Various embodiments disclosed relate to methods of cleaning invert emulsion drilling fluids. In various embodiments, the present invention provides a method of cleaning a drilling fluid. The method includes cleaning a used invert emulsion drilling fluid that includes drilled cuttings to form a cleaned invert emulsion drilling fluid. The cleaning includes processing the used invert emulsion drilling fluid in a separator to remove at least some of the drilled cuttings therefrom.

18 Claims, 6 Drawing Sheets

(56) References Cited

U.S. PATENT DOCUMENTS

| | | | |
|---|---|---|---|
| 2010/0130387 A1* | 5/2010 | Davis | C10G 33/00 |
| | | | 507/103 |
| 2013/0020081 A1 | 1/2013 | Maghrabi et al. | |
| 2013/0020083 A1* | 1/2013 | Wagie | C09K 8/12 |
| | | | 166/285 |
| 2013/0112482 A1 | 5/2013 | Armistead et al. | |
| 2013/0303411 A1 | 11/2013 | Wagle et al. | |
| 2014/0066338 A1* | 3/2014 | Wagle | C09K 8/36 |
| | | | 507/105 |

\* cited by examiner

METHODS OF CLEANING INVERT EMULSION DRILLING FLUIDS

BACKGROUND

Invert emulsion drilling fluids can handle rough downhole conditions (e.g., high temperature, harsh chemicals) and provide advantages such as faster drill rates, easier trips, less torque and drag for directional wellbores, low corrosion rates, and relatively easy casing installations. Most water-based fluids cannot deliver equal performance in all of these areas. While advanced water-based fluids may offer some improvements, the chief reason water-based fluids are still so widely used is their lack of hydrocarbon phase and corresponding greater environmental friendliness; however, high concentrations of salts used in some water-based fluids can be dangerous for the environment as well.

Drilling waste from a land operation with water-based fluids can often be disposed of by burying it or solidifying it with certain additives at the drilling site, in accordance with environmental regulations for the area. This practice enables the operator to deposit the waste solids from drilling the wellbore in the immediate vicinity of the well. Over time, most additives used in water-based fluids and sanctioned for use by the environmental authorities will degrade to the environment. However, most invert emulsion fluids pose a risk to the environment due to the hydrocarbons they contain. Even though the base oils typically used in invert emulsion drilling fluids are refined hydrocarbon cuts of low-toxicity and generally benign character, the hydrocarbons can pose an issue to the environment because oil can block water absorption from most soils and prevent the ecosystem and its living organisms from a healthy uptake of oxygen. Excess oil can create anaerobic conditions that are harmful or fatal to plant life.

Salts, such as calcium chloride, provide the chemical mechanism for shale stabilization in invert emulsion fluids, and are often present in water-based fluids as well. No known methods, even thermal treatments or biological treatments, reduce the total amount of salt present in the waste. For both water-based fluids and invert emulsion fluids, the salts must be diluted to environmentally acceptable levels before disposal.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
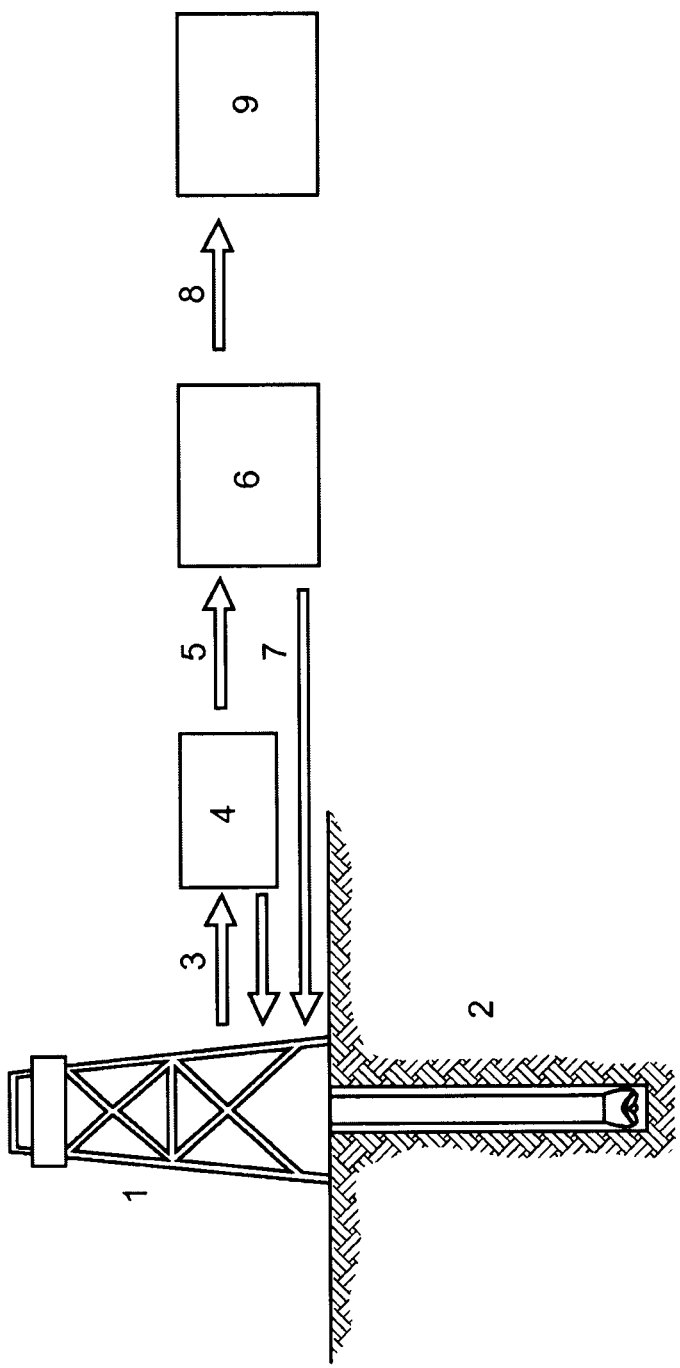
FIG. 1 illustrates a method of cleaning a drilling fluid, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, within 1%, or within 0% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C (S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R), SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n=\Sigma M_i n_i/\Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In various embodiments, the present invention provides a method of cleaning a used drilling fluid. The method includes cleaning a used invert emulsion drilling fluid. The used invert emulsion drilling fluid includes drilled cuttings. The cleaning of the used invert emulsion drilling fluid provides a cleaned invert emulsion drilling fluid. The cleaning includes processing the used invert emulsion drilling fluid in a separator to remove at least some of the drilled cuttings therefrom.

In various embodiments, the present invention provides a method of treating a subterranean formation. The method includes placing in the subterranean formation an invert emulsion drilling fluid. The invert emulsion fluid includes about 0.1 vol % to about 80 vol % internal aqueous phase that includes a ($C_3$-$C_{30}$)hydrocarbon polyol. The invert emulsion fluid includes about 20 vol % to about 90 vol % of an external oil phase. The invert emulsion drilling fluid is substantially salt-free. The method includes drilling the subterranean formation with the invert emulsion drilling fluid. The drilling forms a used invert emulsion drilling fluid that includes drilled cuttings. The method includes cleaning the used invert emulsion drilling fluid to form a cleaned invert emulsion drilling fluid. The cleaning including processing the used invert emulsion drilling fluid in a) a primary separator, b) a thermal separator, or c) both a) and b), to remove at least some of the drilled cuttings therefrom.

In various embodiments, the present invention provides a system including a drill string disposed in a wellbore. The drill string includes a drill bit at a downhole end of the drill string. The system includes an annulus between the drill string and the wellbore. The system includes a pump configured to circulate an invert emulsion drilling fluid through the drill string, through the drill bit, and back above-surface through the annulus. The system also includes a separator configured to process the invert emulsion drilling fluid from the annulus to remove at least some of the drilled cuttings therefrom.

In various embodiments, the present invention provides an apparatus including a) a primary separator, b) a thermal separator, or c) both a) and b), configured to process a used invert emulsion drilling fluid to remove at least some drilled cuttings therefrom.

In various embodiments, the present invention provides methods of using invert emulsion drilling fluids that can overcome environmental challenges of using invert emulsion fluids in oil and gas operations. For example, in some embodiments, the invert emulsion drilling fluid can have less salt than other invert emulsion fluids or water-based drilling fluids, such that less or no dilution of salt needs to occur before disposing wastes to the environment, and such that disposal techniques can be more easily carried out such as phytoremediation, land-spreading, composting, or any other bioremediation methods.

In some embodiments, the invert emulsion drilling fluid can be easier to recycle and reuse, such as due to at least one of lower salt concentrations and use of an alcohol in the aqueous phase that is biodegradable and easily evaporated and condensed, such as requiring less energy and less time to recycle. The ability to easily recycle one or more liquid components of the invert emulsion drilling fluid can reduce the costs required for fluids when using the invert emulsion drilling fluid, including costs of re-building system volume and costs of fluid transport to the drilling site. In various embodiments, the separators used in the method can have a longer life with less cleaning requirements due to use of less salt or no salt in the invert emulsion drilling fluid.

In some embodiments, an alcohol such as a polyol can provide the aqueous phase of the invert emulsion with sufficient hygroscopic character such that the invert emulsion drilling fluid has similar or lower water activity (e.g., similar or greater shale or clay inhibition activity) than other invert emulsion drilling fluids, such as compared to invert emulsion drilling fluids having greater salt concentrations. In some embodiments, the invert emulsion fluid includes an alcohol such as a polyol that can be evaporated and condensed along with oil and optionally water such that the alcohol and the oil can easily be recycled. In some embodiments, the alcohol can be a biodegradable and environmentally-friendly material.

In various embodiments, the present invention can mitigate environmental impact by use of the technologies on surface to remove the hazards associated with drilling waste; such as hydrocarbons and salt. In various embodiments, all or most processing and the final disposal of benign waste can take place on surface. This is in contrast to other methods such as the subterranean injection of wastes or surface burial in landfill applications. These latter two methods do not remove the hazards associated with these wastes but only isolate the wastes in containment chambers which may be compromised at some future time.

In various embodiments, for a remote and isolated drilling location, the combination of the invert emulsion fluid which is substantially salt-free and the cleaning method which can allow for cuttings treatment and recovery of liquid phases can present a highly efficient way to achieve minimum environmental impact from both operations and the ongoing supply of materials, and can manage the volumes of fluid to low requirements with high amounts of re-use. In various embodiments, co-location of the cleaning, recycling and waste disposal activities can eliminate intensive shipping activity usually though trucking but sometimes with boats or aircraft when the roads are not adequate. In various embodiments, even if the location of drilling is not in a remote area, the present invention can provide a more contained operation which has much less impact on the surrounding areas including populations of humans and other life.

Method of Cleaning a Drilling Fluid.

In various embodiments, the present invention provides a method of cleaning a drilling fluid. The drilling fluid can be any suitable invert emulsion drilling fluid. The method can include cleaning a used invert emulsion drilling fluid that includes drilled cuttings to form a cleaned invert emulsion drilling fluid. The used invert emulsion drilling fluid can be generated by drilling in a subterranean formation with an invert emulsion drilling fluid. In some embodiments, the method includes drilling in the subterranean formation with an invert emulsion drilling fluid to generate the used invert emulsion fluid. In other methods, the used invert emulsion drilling fluid is generated prior to carrying out the method.

The method can include placing an invert emulsion drilling fluid in a subterranean formation. The placing of the invert emulsion drilling fluid in the subterranean formation can include contacting the invert emulsion drilling fluid and any suitable part of the subterranean formation, or contacting the invert emulsion drilling fluid and a subterranean material, such as any suitable subterranean material. The subterranean formation can be any suitable subterranean formation. The placing of the invert emulsion drilling fluid in the subterranean formation can be any suitable placing and can include any suitable contacting between the subterranean formation and the invert emulsion drilling fluid. In some embodiments, the method includes obtaining or providing the invert emulsion drilling fluid. The obtaining or providing of the invert emulsion drilling fluid can occur at any suitable time and at any suitable location. The obtaining or providing of the invert emulsion drilling fluid can occur above the surface. The obtaining or providing of the invert emulsion drilling fluid can occur in the subterranean formation (e.g., downhole).

In some embodiments, the method can include drilling the subterranean formation using the invert emulsion drilling fluid. Drilling the subterranean formation using the invert emulsion drilling fluid can add drilled cuttings to the drilling fluid, forming the used invert emulsion fluid including the drilled cuttings. As used herein, the term "drilled cuttings" can refer to cuttings originally generated by drilling the subterranean formation, and cuttings that have been broken down from the original size into any suitable size after the drilling, including very small particles. The invert emulsion drilling fluid can be circulated through a wellbore as the wellbore is being drilled to facilitate the drilling operation. The invert emulsion drilling fluid can carry cuttings up from beneath and around the bit, transport them up the annulus, and allow their separation. Also, the invert emulsion drilling fluid can cool and lubricate the drill bit as well as reduce friction between the drill string and the sides of the hole. The invert emulsion drilling fluid can aid in support of the drill pipe and drill bit, and can provide a hydrostatic head to maintain the integrity of the wellbore walls and prevent well blowouts.

The method includes processing the used invert emulsion drilling fluid in a separator to remove at least some of the drilled cuttings therefrom. The separator can be any suitable separator. The separator can be a distiller (e.g., containing some type of heating element, still, and condenser), solvent extractor, liquefied gas extractor, supercritical fluids extractor, chemically enhanced centrifugation system, thin film separator, or any separation technique allowing recovery of internal and external phase without damaging it or mixing with foreign or unwanted chemicals. In some embodiments, the cleaning includes processing the used invert emulsion drilling fluid in a) a primary separator, b) a thermal separator, or c) both a) and b)).

In some embodiments, the method can include reusing the cleaned invert emulsion drilling fluid, such as placing the drilling fluid in a subterranean formation and drilling the subterranean formation with the drilling fluid. Reusing the cleaned invert emulsion drilling fluid can include adding various additives thereto prior to reusing. The method can include reusing the cleaned invert emulsion drilling fluid any suitable number of times, such as 1 time, 2 times, 3, 4, 5, 6, 8, 10, 15, 20, 30, 50, 75, or 100 or more times.

FIG. 1 illustrates an example embodiment of the method. Drilling rig 1 can produce used invert emulsion fluid 3 that includes drilled cuttings from drilling subterranean formation 2. The used invert emulsion fluid 3 can be transferred to a primary separator 4, with the drilled cuttings separated thereby optionally being sent to a secondary separator such as a centrifuge (not shown). Drilled cuttings and non-reclaimable invert emulsion fluid 5 can be transferred to a thermal separator 6 (e.g., a rotary kiln, hollow flight, hammermill, or other type) that can include process chamber (e.g., wherein liquid is evaporator) and a condensation skid. Liquid phase 7 including hydrocarbons (and optionally including alcohol, such as in embodiments including a substantially salt-free invert emulsion drilling fluid) can be captured in the condensation skid and sent back for reuse in drilling fluids. Solid phase 8 that remains after the thermal separator can be transferred into a landfill site or can be spread on land. In embodiments wherein the invert emulsion fluid is substantially salt-free, the solid phase 8 can be substantially salt-free.

Figure 2:
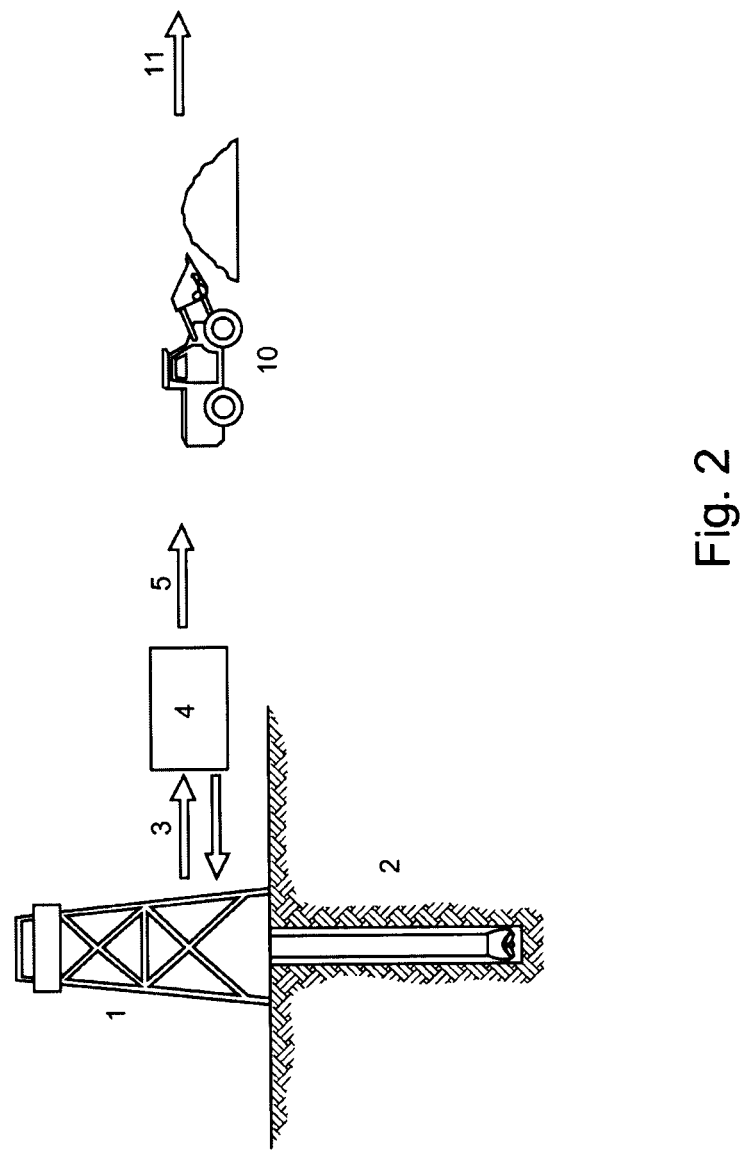
FIG. 2 illustrates a method of cleaning a drilling fluid, in accordance with various embodiments.

FIG. 2 illustrates an example embodiment of the method. Drilling rig 1 can produce used invert emulsion fluid 3 that includes drilled cuttings from drilling subterranean formation 2. The used invert emulsion fluid 3 can be transferred to a primary separator 4, with the drilled cuttings separated thereby optionally being sent to a secondary separator such as a centrifuge (not shown). Drilled cuttings and non-reclaimable invert emulsion fluid 5 can be transferred to a bioremediation site 10, where they can be mixed with or used to prepare compost, or can be used for land spreading through a bioremediation process. After the passage of time 11 the result can be a biologically stabilized organic material that can be re-used in agriculture or used for land spreading. In embodiments wherein the invert emulsion fluid is substantially salt-free, the biologically stabilized organic material can be substantially salt-free.

Figure 3:
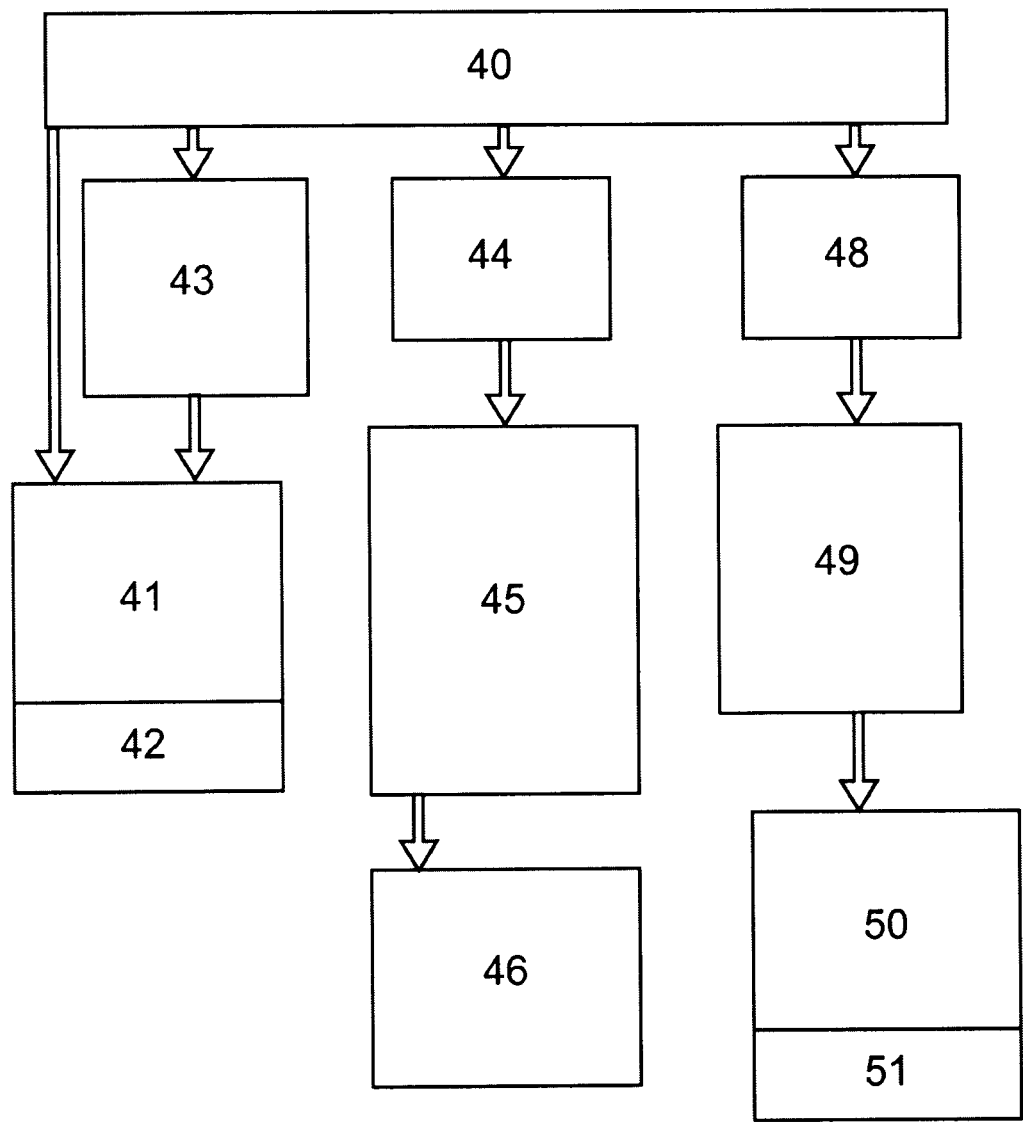
FIG. 3 illustrates a flowchart of a method of cleaning a drilling fluid, in accordance with various embodiments.

FIG. 3 illustrates a flow diagram of an embodiment of the method. In various embodiments, the method includes processing 40 returned (from downhole) salt-free invert emulsion drilling fluid via a primary separator. This separation can result in drill cuttings and cleaned drilling fluid. In some embodiments, the drill cuttings and the salt-free invert emulsion drilling fluid is disposed of 40 via bioremediation methods or other state allowed methods of disposal. The salt-free drilling fluid can be reused 42 for drilling. In some embodiments, the drilled cuttings can be processed 43 via a secondary separator such as a cuttings dryer to lower the amount of oil on the cuttings prior to 41 and 42. In some embodiments, the drilling fluid is optionally processed 44 via a secondary separator, after which the drilling fluid is processed 45 via a thermal separator to recover oil and internal phase of the invert emulsion and to clean the drilled cuttings to about 1% w/w or less oil. The thermal separator can recover oil, water, and alcohol. The drilled cuttings and fluids associated with the drilled cuttings can be disposed of 46, such as via bioremediation methods or other state allowed methods of disposal. The recovered phases can be reused 47, such as to prepare a new salt-free drilling fluid or for other suitable purposes. In some embodiments, the drilled cuttings can be processed 48 via a secondary separator, an optional step. The drilled cuttings can be processed via a thermal separator to recover various phases therefrom, such as oil, water, and alcohol, and to clean the solids to about 1% w/w or less oil. The drilled cuttings and fluids associated with the drilled cuttings can be disposed of 50 via bioremediation methods or other state allowed methods of disposal. The recovered phases can be reused 51, such as to prepare a new salt-free drilling fluid or for other suitable purposes.

Primary Separator.

The cleaning can include processing the used invert emulsion drilling fluid in a primary separator. The processing in the primary separator removes at least some of the drilled cuttings from the used invert emulsion drilling fluid. The primary separator is an optional component of the present invention; in some embodiments, the method includes using a primary separator, whereas in other embodiments, the method does not include using a primary separator. The primary separator can be any suitable separator that removes at least some of the drilled cuttings from the used invert emulsion drilling fluid, such as about 1 wt % to about 100 wt % of the drilled cuttings, or about 50 wt % to about 100 wt %, or about 1 wt % or more, or about 2 wt %, 3, 4, 5, 6, 8, 10, 15, 20, 25, 30, 35, 40, 45, 50, 55, 60, 65, 70, 75, 80, 85, 90, 95, 96, 97, 98, or 99 wt % or more of the drilled cuttings. The drilled cuttings removed by the primary separator can have any suitable amount of invert emulsion fluid remaining thereon, such as about 0.01 wt % to about 90 wt %, about 30 wt % to about 80 wt %, about 40 wt % to about 60 wt %, or about 0.01 wt % or less, about 0.1 wt %, 1, 2, 3, 4, 5, 6, 8, 10, 15, 20, 25, 30, 35, 40, 45, 50, 55, 60, 65, 70, 75, 80, 85, or about 90 wt % or more. The drilled cuttings removed by the primary separator can have any suitable amount of oil phase from the invert emulsion thereof, such as about 0.01 wt % to about 50 wt %, about 1 wt % to about 40 wt %, about 15 wt % to about 30 wt %, or about 0.01 wt % or less, or about 0.1 wt %, 1, 2, 3, 4, 5, 6, 8, 10, 12, 14, 16, 18, 20, 22, 24, 26, 28, 30, 35, 40, 45, or about 50 wt % or more. The primary separator can use any suitable method to separate fluids and drilled cuttings, such as gravity, induced g-force, vacuum, artificial air pressure, or a combination thereof.

In some embodiments, the primary separator can include a shale shaker or is a shale shaker. A shale shaker, also known as a vibratory separator, can be a vibrating sieve-like table upon which the used invert emulsion drilling fluid is deposited and through which invert emulsion drilling fluid having less cuttings therein emerges (e.g., at the bottom of the table). The fluid components of the used inversion emulsion drilling fluid can fall through the perforations of the table, while the solid particulate material can be left on top of the table. In some embodiments, the table has substantially no incline, and the vibratory action alone is sufficient to cause separation. In some embodiments, the table can be inclined, such as an incline from the input end to the output end, or an incline from the output end to the input end. In embodiments wherein the table is inclined from the input end to the output end, used invert emulsion drilling fluid can move down the table in the direction of the incline during processing. The combination of the angle of inclination with the vibrating action of the shale shaker table can enable the solid particles left behind to flow until they fall off the lower end of the shaker table. The amount of vibration and the angle of inclination can be any suitable amount and angle such that the method can be carried out as described herein. The vibration can be caused by any suitable mechanism, such as by an unbalanced weight on a rotating shaft connected to a frame that holds a perforated surface.

Any suitable one or more perforated surfaces can be included in the shale shaker to separate the drilled cuttings from the fluid. The fineness or coarseness of the mesh of the one or more perforated surfaces can be designed to accommodate the flow rate of the invert emulsion drilling fluid and the size of the solids to be removed therefrom. The shale shaker can include one or more screens having perforations therein. The screen can be on a bed or support within a basket in the shaker. The screen can be flat or nearly flat, corrugated, depressed, or contain raised surfaces. In some embodiments, the screen includes a perforated plate base upon which a wire mesh, or other perforated filter overlay, is positioned. The perforated plate base can provide structural support and can allow the passage of fluids therethrough, while the wire mesh overlay can define the largest solid particle capable of passing therethrough. The perforated plate base can be flat or slightly curved in shape. In some embodiments, the perforated plate base can include a plurality of corrugated or pyramid-shaped channels, which can provide additional surface area for fluid-solid separation process to take place, and can act to guide solids along their length toward the end of the shale shaker.

The shale shaker can impart a rapidly reciprocating motion to the basket and hence the screens. In a shale shaker having an incline from the input to the output end, the used invert emulsion drilling fluid can be poured onto a back end of the vibrating screen and flow toward the discharge end of the basket. Large particles that are unable to move through the screen remain on top of the screen and move toward the discharge end of the basket where they are collected. The smaller particles and fluid flow through the screen and collect in a bed, receptacle, sump, or pan beneath the screen.

In some embodiments a fine screen cloth or mesh can be used with the vibrating screen. The screen can have one layer of screen cloth, or two or more overlaying layers of screen cloth or mesh. Layers of cloth or mesh can be bonded together and placed over a support, supports, or over a perforated or apertured plate.

In some embodiments, the invert emulsion fluid emerging from the shale shaker having less drilled cuttings therein is the cleaned invert emulsion fluid. In other embodiments, additional processing steps can be performed on at least one of the separated cuttings from the shale shaker and the invert emulsion fluid emerging from the primary separator. For example, the separated cuttings can be subjected to a secondary separator. The invert emulsion fluid that emerges from the shale shaker can be stored for measurement and evaluation, or can pass through an additional piece of equipment (e.g., a centrifuge, or a smaller sized shale shaker) to remove smaller cuttings and other particulate matter.

Secondary Separator.

In some embodiments, the drilled cuttings that emerge from the primary separator can be wet with fluids. In various embodiments, the drilled cuttings removed in the primary separator can be processed in a secondary separator. The secondary separator is an optional component; in some embodiments, the method includes using the secondary separator, whereas in other embodiments, the method does not include using a secondary separator. The secondary separator can be any suitable one or more separation processes that remove at least some of the liquid from the drilled cuttings. In some embodiments, the liquid removed from the drilled cuttings can be recombined with recovered fluid. The secondary separator can remove any suitable amount of fluid from the drilled cuttings, such as about 1 wt % to about 100 wt % of the fluid, or about 50 wt % to about 100 wt %, or about 1 wt % or more, or about 2 wt %, 3, 4, 5, 6, 8, 10, 15, 20, 25, 30, 35, 40, 45, 50, 55, 60, 65, 70, 75, 80, 85, 90, 95, 96, 97, 98, or 99 wt % or more of the fluid. In various embodiments, the secondary separator can reduce the amount of oil in the drilled cuttings to less than about 25 wt %, less than about 24 wt %, 23, 22, 21, 20, 19, 18, 17, 16, 15, 14, 13, 12, 11, 10, 9, 8, 7, 6, 5, 4, 3, 2, or less than about 1 wt %. In some embodiments, the secondary separator can include a fluid recovery unit such as a screen separator, a hydrocyclone, a cuttings dryer (e.g., a vertical cuttings dryer), a drying shaker, a centrifuge, a hydrocyclone shaker, a membrane separator (e.g., including a selective or non-selective membrane filter or membrane element), a solvent extractor, or other equipment, which can dry the drilled cuttings and recover fluids. The secondary separator can use any suitable method to separate fluids and drilled cuttings, such as gravity, induced g-force, vacuum, artificial air pressure, or a combination thereof.

For example, cuttings from the primary separator can fall onto a rotary vacuum dryer, where the drilled cuttings travel on a circumferentially rotating screen. Air may be used to strip fluid off the drilled cuttings and into the screen, such as by pulling a vacuum from the interior of the rotating screen.

Thermal Separator.

The method can include using a thermal separator, also called a thermal desorption unit. In various embodiments, the method includes processing the primary separator-cleaned invert emulsion fluid, and optionally secondary separator-cleaned invert emulsion fluid (e.g., fluids recovered from the drilled cuttings in the secondary separator), in a thermal separator to form cleaned phases such as oil phase, water phase, alcohol phase, or a combination thereof. In various embodiments, the method includes processing the primary separator-cleaned drilled cuttings, the secondary separator-cleaned drilled cuttings, or a combination thereof, via a thermal separator, to form cleaned drilled cuttings, and to form cleaned phases such as oil phase, water phase, alcohol phase, or a combination thereof. The method can include processing mixtures of primary separator-cleaned invert emulsion fluid and primary separator-cleaned drilled cuttings, mixtures of secondary separator-cleaned invert emulsion fluid and secondary separator-cleaned drilled cuttings, or a combination thereof, in a thermal separator, to form cleaned drilled cuttings, or to form cleaned phases such as oil phase, water phase, alcohol phase, or a combination thereof.

The cleaned phases can be used to form the cleaned invert emulsion drilling fluid. The cleaned invert emulsion fluid can include any suitable amount of any recovered phase, for example about 1 wt % to about 100 wt % of the oil phase of the cleaned invert emulsion fluid can be recovered phase, or about 10 wt % to about 90 wt %, or about 1 wt % or less, or about 2, 3, 4, 5, 10, 15, 20, 25, 30, 35, 40, 45, 50, 55, 60, 65, 70, 75, 80, 85, 90, 95, 96, 97, 98, 99, or about 100 wt %. For example about 1 wt % to about 100 wt % of the aqueous phase of the cleaned invert emulsion fluid can be recovered phase, or about 10 wt % to about 90 wt %, or about 1 wt % or less, or about 2, 3, 4, 5, 10, 15, 20, 25, 30, 35, 40, 45, 50, 55, 60, 65, 70, 75, 80, 85, 90, 95, 96, 97, 98, 99, or about 100 wt %. For example about 1 wt % to about 100 wt % of the alcohol in the cleaned invert emulsion fluid can be recovered phase, or about 10 wt % to about 90 wt %, or about 1 wt % or less, or about 2, 3, 4, 5, 10, 15, 20, 25, 30, 35, 40, 45, 50, 55, 60, 65, 70, 75, 80, 85, 90, 95, 96, 97, 98, 99, or about 100 wt %.

The thermal separator can heat (e.g., directly or indirectly) the invert emulsion drilling fluid or drilled cuttings to evaporate at least some of the liquids therein away from dissolved and insoluble solids therein and then condense at least some of the evaporated liquids, to form cleaned phases such as oil phase, water phase, alcohol phase, or a combination thereof. The thermal separator can desorb or distill invert emulsion fluid. The thermal separator is an optional component of the present invention; in some embodiments, the method includes using the thermal separator, whereas in other embodiments, the method does not include using a thermal separator. The thermal separator can be used after a primary separator (with or without use of a secondary separator). The thermal separator can be used on the used invert emulsion fluid without use of a primary separator (with or without use of a secondary separator). The thermal separator can be used to recover a polyol from the aqueous phase. The thermal separator can be used to recover water from the aqueous phase. The thermal separator can be used to recover the oil phase, or various components thereof. Examples of thermal separators can include hammermill, rotary kiln, hollow flight, and other types of thermal desorption equipment or other similar purpose equipment and technology (e.g., plasma corona, incineration, and the like). In some embodiments, the thermal separator can be operated under vacuum, such as to prevent decomposition of temperature sensitive materials (e.g., to distill at lower temperatures), such as to prevent decomposition of the alcohol. In some embodiments, the thermal desorption or distillation of the external phase can be done with steam. Steam that can be at any suitable conditions, such as superheated, saturated, or under pressure, can be injected into the thermal separator.

The thermal separator can include one or more heating units and one or more condensation units. The one or more heating units can be sufficient to evaporate any suitable amount of the aqueous phase and the oil phase, such as about 1 wt % to about 100 wt % of the fluid, or about 50 wt % to about 100 wt %, or about 1 wt % or more, or about 2 wt %, 3, 4, 5, 6, 8, 10, 15, 20, 25, 30, 35, 40, 45, 50, 55, 60, 65, 70, 75, 80, 85, 90, 95, 96, 97, 98, or 99 wt % or more. The one or more heating units can be sufficient to raise the temperature of the material therein to about 150° C. to about 600° C., about 175° C. to about 400° C., about 200° C. to about 350° C., or about 150° C. or less, or about 160° C., 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 480, 500, 525, 550, or about 600° C. or more.

The thermal separator can include a first stage condenser, such as for condensing at least some of the liquid components from the oil phase. The thermal separator can include a secondary stage condenser, such as for condensing at least one of water and the alcohol from the aqueous phase. In some embodiments, the thermal separator includes only one condenser, whereas in other embodiments, thermal separator can include multiple condensers. The thermal separator can include one or more liquid-liquid separators. The thermal separator can include one or more solid-liquid separators. In other embodiments, a condenser, a liquid-liquid separator, a liquid-solid separator, or a combination thereof, can occur downsteam of the thermal separator. In various embodiments, the thermal separator can include an air emission treatment system (e.g., a scrubber).

The evaporated and condensed liquids from the thermal separator can be further used, to form the cleaned invert emulsion drilling fluid, and can therefore be recycled for beneficial reuse. In various embodiments, the process can be repeated at least two times or more for an invert emulsion fluid containing previously recycled oil or alcohol. Another example for beneficial reuse of evaporated and condensed fluids herein can be use of the oils and alcohols to extract the energy (e.g. for heating, as additives for increasing BTU values of different material to be incinerated and other purposes).

Invert Emulsion Drilling Fluid.

The invert emulsion drilling fluid is an emulsion of an external oil phase and an internal aqueous phase. The internal aqueous phase includes an alcohol.

The internal aqueous phase includes water. The water in the internal aqueous phase can be any suitable water, such as at least one of freshwater, brine, produced water, flowback water, brackish water, and sea water. The water can be freshwater. In addition to the water and the alcohol, the internal aqueous phase can include any suitable amount of one or more water-miscible liquids, such as methanol, ethanol, ethylene glycol, propylene glycol, and the like. Any suitable volume of the invert emulsion drilling fluid can be the internal aqueous phase, such as about 0.1 vol % to about 80 vol %, 10 vol % to about 50 vol %, or about 0.1 vol % or less, or about 1 vol %, 2, 3, 4, 5, 6, 8, 10, 15, 20, 25, 30, 35, 40, 45, 50, 55, 60, 65, 70, 75, or about 80 vol % or more, wherein for a used invert emulsion drilling fluid the volume refers to the liquid volume not including drilled cuttings and other insoluble material carried therein.

The internal aqueous phase includes an alcohol. The internal phase can include one alcohol or multiple alcohols. The alcohol can be any suitable water-miscible alcohol. The alcohol can give the aqueous phase hygroscopic properties similar to the effect of chloride salts normally added to aqueous drilling fluids for clay and shale stabilization, allowing it to absorb or pull water out of the subterranean formation. The water-absorbing properties of the aqueous phase can make the formation layers stronger and keep them stable. The water-absorbing properties of the aqueous phase can reduce or avoid hydration clays and shales and thereby reduce or minimize stickiness, swelling, and mechanical failure of the clays and shales, which can enable the drilling team to work in a more efficient manner. The alcohol can be a biodegradable material that is substantially non-harmful to the environmental. The alcohol can form any suitable volume of the aqueous phase, such as about 0.01 vol % to about 99.9 vol %, or about 1 vol % to about 80 vol %, or at least about 10 vol %, 20, 30, 40, 50, 60, 70, at least 80 vol %, or about 0.01 vol % or less, or about 0.1 vol %, 1, 2, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, 99, or about 99.9 vol % or more. The method can be effective such that 100 wt % of the alcohol is recovered, or about 99 wt %, 98, 97, 96, 95, 94, 93, 92, 91, 90, 85, 80, 75, 70, 65, 60, 55, 50, 45, 40, 35, 30, 25, 20, 15, 10, or 5 wt % or less is recovered.

In some embodiments, the alcohol is a polyol, such as a ($C_3$-$C_{30}$)hydrocarbon polyol. The alcohol can be a triol, such as a ($C_3$-$C_{10}$)alkanetriol. The alcohol can be glycerol.

The invert emulsion fluid can have any suitable salt content, and can have any suitable amount of total dissolved solid. In some embodiments, the invert emulsion drilling fluid can include at least some salt. In some embodiments, the invert emulsion drilling fluid can be substantially salt-free. Low levels of salt in the invert emulsion drilling fluid can allow for easier recycling of liquids in the fluid and can allow for easier disposal of waste into the environment with less or no danger to the environment (e.g., soil or groundwater) as compared to waste having higher salt content. In some embodiments, the invert emulsion fluid has a total dissolved solids level of about 0 mg/L to about 10,000 mg/L, about 0 mg/L to about 1,000 mg/L, of less than 100 mg/L, or about 0 mg/L, 10 mg/L or less, 20, 30, 40, 50, 60, 70, 80, 90, 100, 120, 140, 160, 180, 200, 300, 400, 500, 750, 1,000, 1,500, 2,000, 2,500, 5,00, 7,500, or about 10,000 mg/L or more. In some embodiments, the invert emulsion fluid can have a concentration of any one or more of chloride salts (e.g., calcium chloride, potassium choride, sodium chloride), magnesium sulfate, acetate salts such as potassium acetate, and formate salts such as potassium formate, of about 0 mg/L to about 10,000 mg/L, about 0 mg/L to about 1,000 mg/L, of less than 100 mg/L, or about 0 mg/L, 10 mg/L or less, 20, 30, 40, 50, 60, 70, 80, 90, 100, 120, 140, 160, 180, 200, 300, 400, 500, 750, 1,000, 1,500, 2,000, 2,500, 5,000, 7,500, or about 10,000 mg/L or more. In some embodiments, the invert emulsion fluid can be substantially free of any one or more of chloride salts (e.g., calcium chloride, potassium choride, sodium chloride), magnesium sulfate, acetate salts such as potassium acetate, and formate salts such as potassium formate. In some embodiments, the invert emulsion fluid can be substantially free of at least one of organophilic clays and lignites.

The external oil phase includes a hydrophobic liquid. The external oil phase can include one hydrophobic liquid or multiple hydrophobic liquids. The hydrophobic liquid in the external oil phase can be any suitable hydrophobic liquid, such as at least one of a synthetic oil (e.g., including at least one of an ester and an olefin), a diesel oil, and a mineral oil (e.g., including a paraffin such as an n-paraffin or iso-paraffins, a cyclic alkane, a branched alkane, or any combination thereof. Any suitable volume of the invert emulsion drilling fluid can be the external oil phase, such as about 20 vol % to about 99.9 vol %, about 50 vol % to about 90 vol %, or about 20 vol % or less, or about 25 vol %, 30, 35, 40, 45, 50, 55, 60, 65, 70, 75, 80, 85, 90, 95, 96, 97, 98, 99, or about 99.9 vol % or more, wherein for a used invert emulsion drilling fluid the volume refers to the liquid volume not including drilled cuttings and other insoluble material carried therein.

In various embodiments, the invert emulsion drilling fluid can include at least one of a filtration control additive and a weighting material, such as about 0.01 wt % to about 50 wt %, or about 1 wt % to about 20 wt %, or about 0.01 wt % or less, or about 0.1 wt %, 1, 2, 3, 4, 5, 10, 15, 20, 25, 30, 35, 40, 45, or about 50 wt % or more.

The aqueous phase of the invert emulsion drilling fluid can optionally include any component used in water-based drilling fluids, such as at least one of a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), acetates (e.g., potassium acetate, sodium acetate), nitrates (e.g., nitrates suitable for use as fertilizers), cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the aqueous phase of the invert emulsion drilling fluid.

The oil phase of the invert emulsion drilling fluid can optionally include any component used in oil-based fluids, such as at least one of an emulsifier, a suspension control agent, a weight or density control agent, an oil-wetting agent, a fluid loss or filtration control agent, and a rheology control agent. Surface active ingredients may reside in the oil phase, at the oil-water interface, or even adhered to solid particles in the fluid or the surfaces found in the well annulus, drill string, containment vessels, and the like. Any ingredient listed in this paragraph can be either present or not present in the oil phase of the invert emulsion drilling fluid.

Emulsifier.

In various embodiments, the invert emulsion drilling fluid includes an emulsifier. The invert emulsion drilling fluid can include one emulsifier or more than one emulsifier. The emulsifier can be in the aqueous phase, the oil phase, or in both phases. The emulsifier can be any suitable emulsifier that aids in stabilizing the emulsion between the internal aqueous phase and the external oil phase of the invert emulsion drilling fluid. Any suitable proportion of the invert emulsion drilling fluid can be the one or more emulsifiers, such as about 0.01 wt % to about 20 wt %, or about 0.1 wt % to about 10 wt %, or about 0.01 wt % or less, or about 0.1 wt %, 1, 2, 3, 4, 5, 6, 7, 8, 9, 10, 12, 14, 16, 18, or about 20 wt % or more.

The emulsifier can include a hydrophobic amine. The emulsifier can include one hydrophobic amine or more than one hydrophobic amine. In some embodiments, the emulsifier can include a combination of a hydrophobic amine and one or more organic acids. The hydrophobic amine and the organic acid can be complexed such that the amine is acidified by the acid to form an ammonium ion with a counterion that can be the conjugate base of the organic acid. The hydrophobic amine can include any suitable number of amine groups, any suitable number of which can be acidified by an organic acid.

The hydrophobic amine can have the structure:

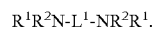

At each occurrence $R^1$ and $R^2$ can each independently be chosen from —H and substituted or unsubstituted $(C_1-C_{20})$ hydrocarbyl. At each occurrence $R^1$ and $R^2$ can be —H. The variable $L^1$ can be a hydrophobic substituted or unsubstituted $(C_{10}-C_{60})$hydrocarbylene. The variable $L^1$ can have a structure according to that shown in FIG. 5.

Figure 6:
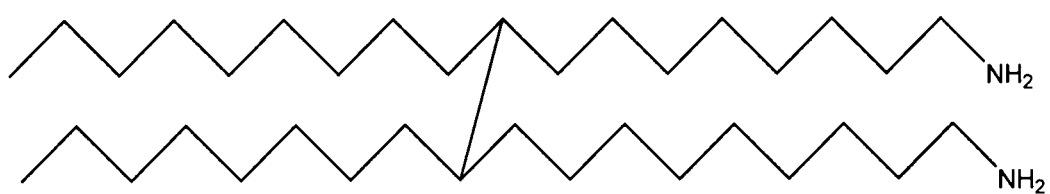
FIG. 6 is a molecular structure of the hydrophobic amine.

In various embodiments, the hydrophobic amine has a structure according to that shown in FIG. 6.

The organic acid can be at least one of lactic acid, formic acid, acrylic acid, acetic acid, chloroacetic acid, dichloroacetic acid, trichloroacetic acid, trifluoroacetic acid, propanoic acid, butyric acid, pentanoic acid, hexanoic acid, heptanoic acid, oxalic acid, malonic acid, succinic acid, glutaric acid, adipic acid, pimelic acid, suberic acid, azelaic acid, sebacic acid, maleic acid, fumaric acid, aspartic acid, citric acid, isocitric acid, aconitic acid, tartaric acid, benzoic acid, p-amino benzoic acid, phthalic acid, terephthalic acid, and trimesic acid. In some embodiments, the organic acid is citric acid.

Suspending Agent.

In various embodiments, the invert emulsion drilling fluid includes a suspending agent. The invert emulsion drilling fluid can include one suspending agent or multiple suspending agent. The suspending agent can be in the aqueous phase, in the oil phase, or in both phases. The suspending agent can be any suitable suspending agent that increases the ability of the invert emulsion to suspend insoluble materials such as drilled cuttings. Any suitable proportion of the invert emulsion drilling fluid can be the one or more suspending agents, such as about 0.01 wt % to about 20 wt %, or about 0.1 wt % to about 10 wt %, or about 0.01 wt % or less, or about 0.1 wt %, 1, 2, 3, 4, 5, 6, 7, 8, 9, 10, 12, 14, 16, 18, or about 20 wt % or more.

In some embodiments, the suspending agent is a polymer including urea linkages. The suspending agent can be a polymer formed from allowing a diamine or polyamine to react with a diiscyanate or polyisocyanate. The polymer can have any suitable molecular weight, such as about 300 g/mol to about 1,000,000 g/mol, or about 300 g/mol or less, or about 500 g/mol, 750, 1,000, 1,500, 2,000, 2,500, 5,000, 7,500, 10,000, 15,000, 20,000, 25,000, 50,000, 75,000, 100,000, 150,000, 200,000, 250,000, 500,000, 750,000 g/mol, or about 1,000,000 g/mol or more.

The diamine or polyamine can be hydrazine, ethylenediamine, 1,2-propylenediamine, 1,3-propylenediamine, 1-amino-3-methylaminopropane, 1,4-diaminobutane, N,N'-dimethyl-1-ethylenediamine, 1,6-diaminohexane, 1,12-diaminododecane, 2,5-diamino-2,5-dimethylhexane, trimethyl-1,6-hexane-diamine, diethylenetriamine, N,N',N''-trimethyldiethylenetriamine, triethylenetetraamine, tetraethylenepentamine, pentaethylenehexamine, polyethyleneimine, dipropylenetriamine, tripropylenetetraamine, bis-(3-aminopropyl)amine, bis-(3-aminopropyl)methylamine, piperazine, 1,4-diaminocyclohexane, isophoronediamine, N-cyclohexyl-1,3-propanediamine, bis-(4-amino-cyclohexyl)methane, bis-(4-amino-3-methylcyclohexyl)-methane, bisaminomethyltricyclodecane (TCDdiamine), o-, m- or p-phenylenediamine, 1,2-diamino-3-methylbenzene, 1,3-diamino-4-methylbenzene(2,4-diaminotoluene), 1,3-bisaminomethyl-4,6-dimethylbenzene, 2,4-diamino-3,5-diethyltoluene, 2,6-diamino-3,5-diethyltoluene, 1,4-diaminonaphthalene, 1,6-diaminonaphthalene, 1,8-diaminonaphthalene, 2,7-diaminonaphthalene, bis-(4-amino-phenyl)-methane, polymethylenepolyphenylamine, 2,2-bis-(4-aminophenyl)-propane, 4,4'-oxybisaniline, 1,4-butanediol bis-(3-aminopropyl ether), 2-(2-aminoethylamino)ethanol, 2,6-diamino-hexanoic acid, liquid polybutadienes or acrylonitrile/butadiene copolymers including amino groups (e.g., having a molecular weight of about 500 to about 10,000 g/mol), or a polyether including amino groups (e.g., based on polyethylene oxide, polypropylene oxide or polytetrahydrofuran and having a content of primary or secondary amino groups of from 0.25 to approximately 8 mmol/g, such as 1 to 8 mmol/g).

The diisocyanate or polyisocyanate can be at least one of hexamethylenediisocyanate (HDI), toluene-diisocyanate (TDI), 2,2'-diisocyanatodiphenylmethane, 2,4'-diisocyanatodiphenylmethane, 4,4'-diisocyanatodiphenylmethane, polymethylenepolyphenyldiisocyanate (PMDI), naphthalene-diisocyanate (NDI), 1,6-diisocyanato-2,2,4-trimethylhexane, isophorone-diisocyanate, (3-isocyanato-methyl)-3,5,5-trimethyl cyclohexyl isocyanate (IPDI), tris(4-isocyanatophenyl)-methane, phosphoric acid tris-(4-isocyanato-phenyl ester), and thiophosphoric acid tris-(4-isocyanato-phenyl ester).

Other Components.

The invert emulsion drilling fluid, or a mixture including the same, can include any suitable additional component in any suitable proportion, such that the invert emulsion drilling fluid, or mixture including the same, can be used as described herein. The invert emulsion drilling fluid or a mixture including the same can be designed to at least partially optimize a drilling operation in accordance with the characteristics of a particular geological formation. For example, the invert emulsion drilling fluid can be formulated to prevent unwanted influxes of formation fluids from permeable rocks, or to form a thin, low permeability filter cake that can temporarily seal pores, other openings, and formations penetrated by the bit. Additives may serve singular or multiple functions, so that in some embodiments more or less of them may be required to customize the fluid to maximize its operational suitability.

In some embodiments, the invert emulsion drilling fluid or a mixture including the same includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the invert emulsion drilling fluid or a mixture including the same, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly($(C_2$-$C_{10})$alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the invert emulsion drilling fluid or a mixture including the same can include one or more crosslinkers. The crosslinker can be any suitable crosslinker.

In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$ hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly($(C_1-C_{20})$alkenyl)-substituted mono- or poly-$(C_1-C_{20})$ alkyl ether (e.g., pentaerythritol allyl ether), and a poly$(C_2-C_{20})$alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the invert emulsion drilling fluid or a mixture including the same, about 0.001 wt % to about 0.01 wt %, or about 0.000.01 wt % or less, or about 0.000.05 wt %, 0.000.1, 0.000.5, 0.001, 0.005, 0.01, 0.05, 0.1, 0.5, 1, 2, 3, 4, or about 5 wt % or more.

In some embodiments, the invert emulsion drilling fluid or a mixture including the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the invert emulsion drilling fluid or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The invert emulsion drilling fluid or a mixture including the same can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the invert emulsion drilling fluid or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In some embodiments the invert emulsion drilling fluid or a mixture including the same can include any suitable amount of any suitable material used in a downhole fluid. For example, the invert emulsion drilling fluid or a mixture including the same can include water, saline, aqueous base, acetates (e.g., potassium acetate, sodium acetate), nitrates (e.g., nitrates suitable for use as fertilizers), acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the invert emulsion drilling fluid or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, invert emulsion drilling fluid or a mixture including the same can include one or more additive components such as: X-TEND® II, PAC™—R, PAC™-L, LIQUI-VIS® EP, BRINEDRIL-VIS™, BARAZAN®, N-VIS®, and AQUAGEL® viscosifiers; THERMA-CHEK®, N-DRIL™ N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUD-LUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of invert emulsion drilling fluid or a mixture including the same can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

Drilling Assembly.

Figure 4:
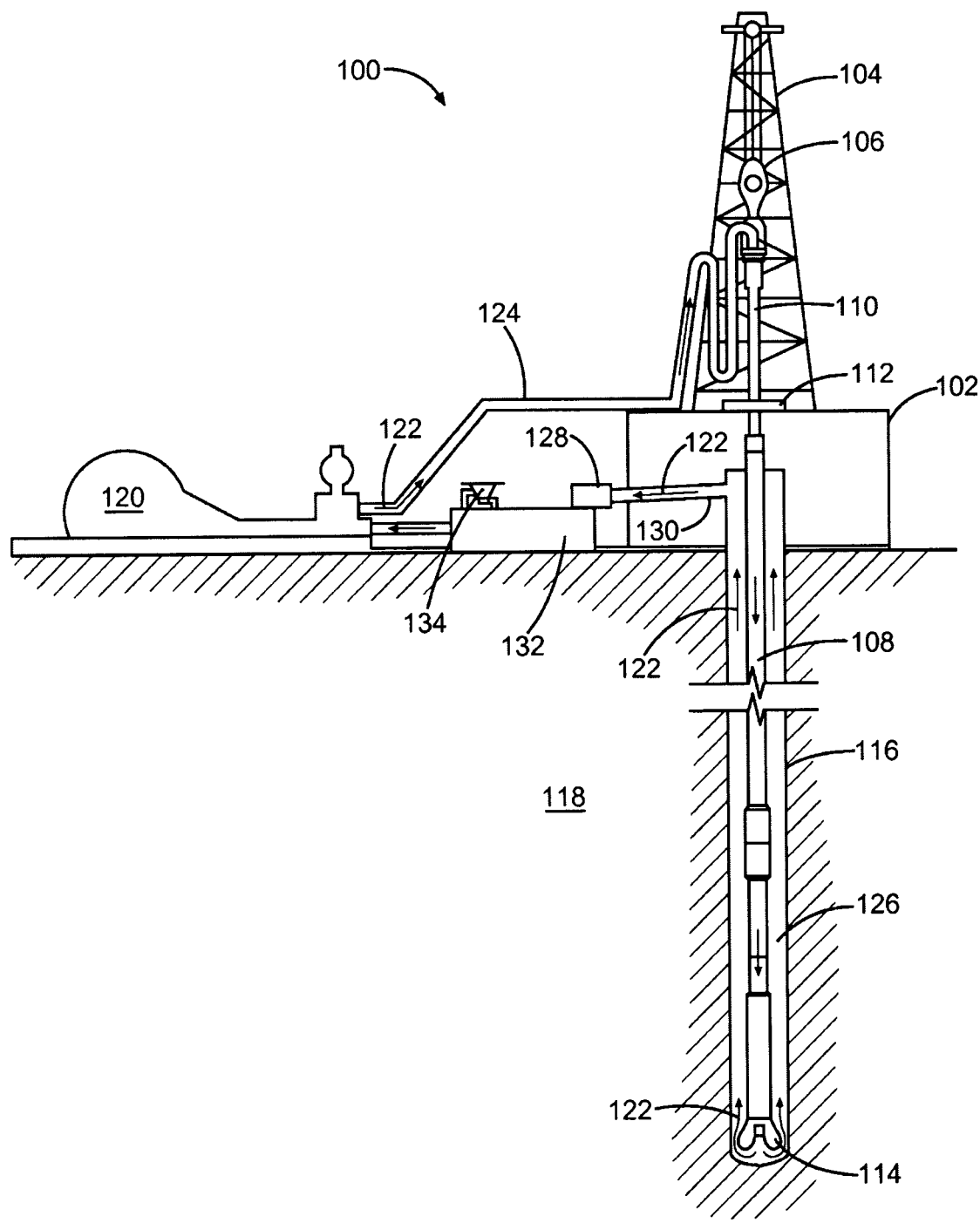
FIG. 4 illustrates a drilling assembly, in accordance with various embodiments.

In various embodiments, the invert emulsion drilling fluid or a mixture including the same can directly or indirectly affect one or more components or pieces of equipment associated with the preparation, delivery, recapture, recycling, reuse, and/or disposal of the invert emulsion drilling fluid or a mixture including the same. For example, and with reference to FIG. 4, the invert emulsion drilling fluid or a mixture including the same can directly or indirectly affect one or more components or pieces of equipment associated with an exemplary wellbore drilling assembly 100, according to one or more embodiments. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string

108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

Components can be combined to form the invert emulsion drilling fluid 122 via a mixing hopper 134 communicably coupled to or otherwise in fluid communication with the retention pit 132. The mixing hopper 134 can include mixers and related mixing equipment known to those skilled in the art. In other embodiments, however, components can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where one or more components of the invert emulsion drilling fluid can be stored, reconditioned, and/or regulated until added to the drilling fluid 122.

As mentioned above, the invert emulsion drilling fluid or a mixture including the same can directly or indirectly affect the components and equipment of the drilling assembly 100. For example, the invert emulsion drilling fluid or a mixture including the same can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the invert emulsion drilling fluid or a mixture including the same.

The invert emulsion drilling fluid or a mixture including the same can directly or indirectly affect the pump 120, which representatively includes any conduits, pipelines, trucks, tubulars, and/or pipes used to fluidically convey the invert emulsion drilling fluid composition to the subterranean formation; any pumps, compressors, or motors (e.g., topside or downhole) used to drive the invert emulsion drilling fluid into motion; any valves or related joints used to regulate the pressure or flow rate of the drilling fluid; and any sensors (e.g., pressure, temperature, flow rate, and the like), gauges, and/or combinations thereof, and the like. The invert emulsion drilling fluid can also directly or indirectly affect the mixing hopper 134 and the retention pit 132 and their assorted variations.

The invert emulsion fluid or a mixture including the same can also directly or indirectly affect the various downhole or subterranean equipment and tools that can come into contact therewith, such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The invert emulsion drilling fluid or mixture including the same can also directly or indirectly affect any downhole heat exchangers, valves and corresponding actuation devices, tool seals, packers and other wellbore isolation devices or components, and the like associated with the wellbore 116. The invert emulsion drilling fluid or mixture including the same can also directly or indirectly affect the drill bit 114, which can include roller cone bits, polycrystalline diamond compact (PDC) bits, natural diamond bits, hole openers, reamers, coring bits, and the like.

While not specifically illustrated herein, the invert emulsion drilling fluid or mixture including the same can also directly or indirectly affect any transport or delivery equipment used to convey the invert emulsion drilling fluid or mixture including the same to the drilling assembly 100 such as, for example, any transport vessels, conduits, pipelines, trucks, tubulars, and/or pipes used to fluidically move the drilling fluid from one location to another, any pumps, compressors, or motors used to drive the drilling fluid into motion, any valves or related joints used to regulate the pressure or flow rate of the drilling fluid, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein.

The system can include a drill string disposed in a wellbore, with the drill string including a drill bit at a downhole end of the drill string. The system can also include an annulus between the drill string and the wellbore. The system can also include a pump configured to circulate an invert emulsion drilling fluid through the drill string, through the drill bit, and back above-surface through the annulus. The invert emulsion drilling fluid can be any suitable invert emulsion drilling fluid described herein. In some embodiments, the system can include a primary separator configured to process the used invert emulsion drilling fluid exiting the annulus to remove at least some of the drilled cuttings therefrom.

In various embodiments, the present invention provides an apparatus. The apparatus can be any suitable apparatus that can perform an embodiment of the method described herein. The apparatus can include a primary separator configured to process a used invert emulsion drilling fluid to remove at least some drilled cuttings therefrom.

In various embodiments, the invert emulsion drilling fluid can directly or indirectly affect the various downhole or subterranean equipment and tools that can come into contact with the invert emulsion drilling fluid during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above.

EXAMPLES

Various embodiments of the present invention can be better understood by reference to the following Examples which are offered by way of illustration. The present invention is not limited to the Examples given herein.

Water activity was measured using a Pawkit, a handheld device designed by AquaLab. Water activities were measured prior to mixing the fluids. Water activity is the vapor pressure of water in a substance divided by the vapor pressure of pure water. Water activity can be used as a direct correlation to that of a salt-based internal phase; for salt-free invert emulsion drilling fluids the water activity can be an indicator of internal phase component concentrations that are similar to water phase salinity for invert emulsion fluids made with brines. For example, 50% aqueous glycerin produces a water activity of 0.84 which is equivalent to 190 kppm of salt in a mud. The aqueous phase activity can be adjusted to obtain the proper equivalent Water Phase Salinity, WPS.

Example 1. Invert Emulsion Drilling Fluid

An invert emulsion drilling fluid was formed having the following composition.

| Density | 10 lb/gal (1.20 g/cm$^3$) |
|---|---|
| OWR | 70/30 |
| Recycled base oil | 163.3 lb (74.07 kg) |
| EZ MUL ® NT | 9 lb (4.08 kg) |
| Lime | 1 lb (454 g) |
| RHEMOD ™ L | 2 lb (907 g) |
| ADAPTA ® | 4 lb (1.81 g) |
| Polymer | 3 lb (1.36 g) |
| TAU-MOD ® | 5 lb (2.27 g) |
| 60% Glycerin in water | 83.9 lb (38.1 kg) |
| Rev Dust | 20 lb (9.07 kg) |
| BAROID | 126 lb (57.2 kg) |

Example 2. Separation of Invert Emulsion Drilling Fluid

The invert emulsion drilling fluid of Example 1 was subjected to a small-scale thermal separation. A small-scale retort device was used, a 50 mL FANN® retort, approximately 60 cm tall by 30 cm wide and 30 cm deep. The retort device separated the invert emulsion drilling fluid of Example 1 was separated into three phases: internal phase, external phase, and solids. The process was designed to simulate the industrial scale process applying the most stringent conditions that could be seen in the similar field applications. These conditions were used see effects on fluid properties under the most undesirable circumstances and to show that the fluid properties remain acceptable for further recycle and reuse. The invert emulsion drilling fluid of Example 1 was placed in the retort then heated up to 650° F. (~340° C.) until no more liquid was emitted. External phase and internal phase of the invert emulsion were separated and then used to prepare the new drilling fluid using both of these recycled components.

The thermal separator produced recycled hydrocarbon phase and water/glycol phase. Without modification, the recycled portions had about 40% glycerin, as compared to the original mud of Example 1 which was 60% active. The aqueous phase was treated with glycerin to return the glycerin level to 60%, and a recycled mud mixture was formed having the same composition as the mud of Example 1. The water activity of the original mud of Example 1 was 0.75 and the water activity of the recycled mud was also 0.75. The other typical properties of the recycled mud were similar to the original mud of Example 1 as well, such as rheology and electrical stability. This shows that the recycled components can be reused to reform a mud with identical properties.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of cleaning a drilling fluid, the method comprising:

cleaning a used invert emulsion drilling fluid comprising drilled cuttings to form a cleaned invert emulsion drilling fluid, the cleaning comprising processing the used invert emulsion drilling fluid in a) a primary separator, b) a thermal separator, or c) both a) and b), to remove at least some of the drilled cuttings therefrom.

Embodiment 2 provides the method of claim 1, wherein the cleaning comprises processing the used invert emulsion drilling fluid in a) a primary separator, b) a thermal separator, or c) both a) and b).

Embodiment 3 provides the method of Embodiment 2, wherein the primary separator comprises a shale shaker.

Embodiment 4 provides the method of any one of Embodiments 2-3, further comprising processing the drilled cuttings removed in the primary separator in a secondary separator to remove at least some of the invert emulsion fluid therefrom.

Embodiment 5 provides the method of Embodiment 4, wherein the secondary separator comprises a fluid recovery unit.

Embodiment 6 provides the method of any one of Embodiments 4-5, wherein the secondary separator comprises a cuttings dryer.

Embodiment 7 provides the method of any one of Embodiments 4-6, wherein the secondary separator comprises a vertical cuttings dryer.

Embodiment 8 provides the method of any one of Embodiments 2-7, wherein processing the used invert emulsion drilling fluid in the primary separator forms a primary separator-cleaned invert emulsion fluid, further comprising processing the primary-separator-cleaned invert emulsion drilling fluid in the thermal separator, to form the cleaned invert emulsion drilling fluid.

Embodiment 9 provides the method of Embodiment 8, wherein the thermal separator heats the primary-separator-cleaned invert emulsion drilling fluid to evaporate at least some liquids therein away from dissolved and insoluble solids therein and condenses at least some of the evaporated liquids, to form the cleaned invert emulsion drilling fluid.

Embodiment 10 provides the method of any one of Embodiments 2-9, wherein the thermal separator comprises a heating unit and a condensation unit.

Embodiment 11 provides the method of any one of Embodiments 2-10, wherein the thermal separator comprises a first stage condenser and a second stage condenser.

Embodiment 12 provides the method of any one of Embodiments 1-11, further comprising reusing the cleaned invert emulsion drilling fluid.

Embodiment 13 provides the method of any one of Embodiments 1-12, wherein the invert emulsion drilling fluid comprises an internal aqueous phase comprising an alcohol; and
an external oil phase.

Embodiment 14 provides the method of Embodiment 13, wherein the internal aqueous phase is about 0.1 vol % to about 80 vol % of the invert emulsion drilling fluid.

Embodiment 15 provides the method of any one of Embodiments 13-14, wherein the internal aqueous phase is about 10 vol % to about 50 vol % of the invert emulsion drilling fluid.

Embodiment 16 provides the method of any one of Embodiments 13-15, wherein the external oil phase is about 20 vol % to about 99.9 vol % of the invert emulsion drilling fluid.

Embodiment 17 provides the method of any one of Embodiments 13-16, wherein the external oil phase is about 50 vol % to about 90 vol % of the invert emulsion drilling fluid.

Embodiment 18 provides the method of any one of Embodiments 13-17, wherein the alcohol is at least about 40 wt % of the aqueous phase.

Embodiment 19 provides the method of any one of Embodiments 13-18, wherein the alcohol is a ($C_3$-$C_{30}$) hydrocarbon polyol.

Embodiment 20 provides the method of any one of Embodiments 13-19, wherein the alcohol is a triol.

Embodiment 21 provides the method of any one of Embodiments 13-20, wherein the alcohol is glycerol.

Embodiment 22 provides the method of any one of Embodiments 13-21, wherein the external oil phase comprises at least one of a synthetic oil, a diesel oil, and a mineral oil.

Embodiment 23 provides the method of any one of Embodiments 13-22, wherein water in the internal aqueous phase comprises at least one of freshwater, brine, produced water, flowback water, brackish water, and sea water.

Embodiment 24 provides the method of any one of Embodiments 13-23, wherein water in the internal aqueous phase is freshwater.

Embodiment 25 provides the method of any one of Embodiments 1-24, wherein the invert emulsion drilling fluid comprises an emulsifier.

Embodiment 26 provides the method of Embodiment 25, wherein the emulsifier comprises a hydrophobic amine and an organic acid.

Embodiment 27 provides the method of Embodiment 26, wherein the organic acid is at least one of lactic acid, formic acid, acrylic acid, acetic acid, chloroacetic acid, dichloroacetic acid, trichloroacetic acid, trifluoroacetic acid, propanoic acid, butyric acid, pentanoic acid, hexanoic acid, heptanoic acid, oxalic acid, malonic acid, succinic acid, glutaric acid, adipic acid, pimelic acid, suberic acid, azelaic acid, sebacic acid, maleic acid, fumaric acid, aspartic acid, citric acid, isocitric acid, aconitic acid, tartaric acid, benzoic acid, p-amino benzoic acid, phthalic acid, terephthalic acid, and trimesic acid.

Embodiment 28 provides the method of any one of Embodiments 26-27, wherein the organic acid is citric acid.

Embodiment 29 provides the method of any one of Embodiments 26-28, wherein the hydrophobic amine has the structure:

$$R^1R^2N-L^1-NR^2R^1$$

wherein at each occurrence $R^1$ and $R^2$ are each independently chosen from —H and substituted or unsubstituted ($C_1$-$C_{20}$) hydrocarbyl; and $L^1$ is a hydrophobic substituted or unsubstituted ($C_{10}$-$C_{60}$) hydrocarbylene.

Embodiment 30 provides the method of Embodiment 29, wherein at each occurrence $R^1$ and $R^2$ are —H.

Figure 5:
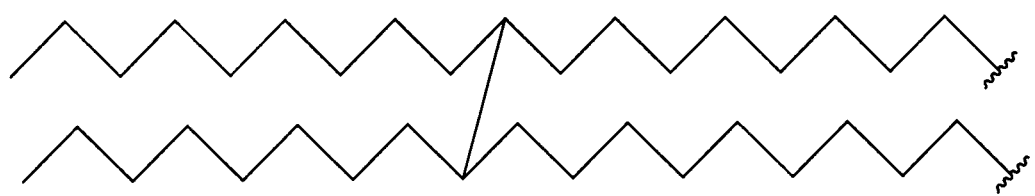
FIG. 5 is a molecular structure of the variable $L^1$ of the hydrophobic amine.

Embodiment 31 provides the method of any one of Embodiments 29-30, wherein $L^1$ has the structure shown in FIG. 5.

Embodiment 32 provides the method of any one of Embodiments 26-31, wherein the hydrophobic amine has the structure shown in FIG. 6.

Embodiment 33 provides the method of any one of Embodiments 1-32, wherein the invert emulsion drilling fluid comprises a suspending agent.

Embodiment 34 provides the method of Embodiment 33, wherein the suspending agent is a polymer comprising urea linkages.

Embodiment 35 provides the method of any one of Embodiments 33-34, wherein the suspending agent is a polymer formed from a diamine or polyamine and a diisocyanate or polyisocyanate.

Embodiment 36 provides the method of Embodiment 35, wherein the diamine or polyamine is hydrazine, ethylenediamine, 1,2-propylenediamine, 1,3-propylenediamine, 1-amino-3-methylaminopropane, 1,4-diaminobutane, N,N'-dimethyl-1-ethylenediamine, 1,6-diaminohexane, 1,12-diaminododecane, 2,5-diamino-2,5-dimethylhexane, trimethyl-1,6-hexane-diamine, diethylenetriamine, N,N',N''-trimethyldiethylenetriamine, triethylenetetraamine, tetraethylenepentamine, pentaethylenehexamine, polyethyleneimine, dipropylenetriamine, tripropylenetetraamine, bis-(3-aminopropyl)amine, bis-(3-aminopropyl)methylamine, piperazine, 1,4-diaminocyclohexane, isophoronediamine, N-cyclohexyl-1,3-propanediamine, bis-(4-amino-cyclohexyl)methane, bis-(4-amino-3-methylcyclohexyl)-methane, bisaminomethyltricyclodecane (TCDdiamine), o-, m- or p-phenylenediamine, 1,2-diamino-3-methylbenzene, 1,3-diamino-4-methylbenzene(2,4-diaminotoluene), 1,3-bisaminomethyl-4,6-dimethylbenzene, 2,4-diamino-3,5-diethyltoluene, 2,6-diamino-3,5-diethyltoluene, 1,4-diaminonaphthalene, 1,6-diaminonaphthalene, 1,8-diaminonaphthalene, 2,7-diaminonaphthalene, bis-(4-amino-phenyl)-methane, polymethylenepolyphenylamine, 2,2-bis-(4-aminophenyl)-propane, 4,4'-oxybisaniline, 1,4-butanediol bis-(3-aminopropyl ether), 2-(2-aminoethylamino)ethanol, 2,6-diamino-hexanoic acid, liquid polybutadienes or acrylonitrile/butadiene copolymers comprising amino groups, and polyethers comprising amino groups.

Embodiment 37 provides the method of any one of Embodiments 35-36, wherein the diisocyanate or polyisocyanate is at least one of hexamethylenediisocyanate (HDI), toluene-diisocyanate (TDI), 2,2'-diisocyanatodiphenylmethane, 2,4'-diisocyanatodiphenylmethane, 4,4'-diisocyanatodiphenylmethane, polymethylenepolyphenyldiisocyanate (PMDI), naphthalene-diisocyanate (NDI), 1,6-diisocyanato-2,2,4-trimethylhexane, isophorone-diisocyanate, (3-isocyanato-methyl)-3,5,5-trimethyl cyclohexyl isocyanate (IPDI), tris(4-isocyanatophenyl)-methane, phosphoric acid tris-(4-isocyanato-phenyl ester), and thiophosphoric acid tris-(4-isocyanato-phenyl ester).

Embodiment 38 provides the method of any one of Embodiments 1-37, wherein the invert emulsion fluid comprises a filtration control additive.

Embodiment 39 provides the method of any one of Embodiments 1-38, wherein the invert emulsion fluid comprises a weighting material.

Embodiment 40 provides the method of any one of Embodiments 1-39, wherein the invert emulsion fluid is substantially salt-free.

Embodiment 41 provides the method of any one of Embodiments 1-40, wherein the invert emulsion fluid has a total dissolved solids level of 0 mg/L to about 1,000 mg/L.

Embodiment 42 provides the method of any one of Embodiments 1-41, wherein the invert emulsion fluid has a total dissolved solids level of less than 100 mg/L.

Embodiment 43 provides the method of any one of Embodiments 1-42, wherein the invert emulsion fluid has about 0 mg/L to about 1,000 mg/L of any one of calcium chloride, potassium chloride, sodium chloride, magnesium sulfate, acetate salts, and formate salts.

Embodiment 44 provides the method of any one of Embodiments 1-43, wherein the invert emulsion fluid has less than about 100 mg/L of any one of calcium chloride, potassium chloride, sodium chloride, magnesium sulfate, acetate salts, and formate salts.

Embodiment 45 provides the method of any one of Embodiments 1-44, wherein the invert emulsion fluid is substantially free of calcium chloride, potassium chloride, sodium chloride, magnesium sulfate, acetate salts, and formate salts.

Embodiment 46 provides the method of any one of Embodiments 1-45, wherein the invert emulsion drilling fluid further comprises cellulose, starch, alkalinity control agent, acidity control agent, density control agent, density modifier, emulsifier, dispersant, polymeric stabilizer, cross-linking agent, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 47 provides the method of any one of Embodiments 2-46, wherein the placing of the composition in the subterranean formation comprises pumping the composition through a tubular disposed in a wellbore and into the subterranean formation.

Embodiment 48 provides the method of any one of Embodiments 2-47, wherein the placing of the invert emulsion drilling fluid in the subterranean formation comprises pumping the composition through a drill string disposed in a wellbore, through a drill bit at a downhole end of the drill string, and back above-surface through an annulus.

Embodiment 49 provides a system for performing the method of any one of Embodiments 2-48, the system comprising:
 a tubular disposed in the subterranean formation; and
 a pump configured to pump the composition in the subterranean formation through the tubular.

Embodiment 50 provides a system for performing the method of any one of Embodiments 2-48, the system comprising:
 a drill string disposed in a wellbore, the drill string comprising a drill bit at a downhole end of the drill string;
 an annulus between the drill string and the wellbore; and
 a pump configured to circulate the composition through the drill string, through the drill bit, and back above-surface through the annulus.

Embodiment 51 provides a method of treating a subterranean formation, the method comprising:
placing in the subterranean formation an invert emulsion drilling fluid comprising
about 0.1 vol % to about 80 vol % internal aqueous phase that comprises a $(C_3-C_{30})$hydrocarbon polyol; and
about 20 vol % to about 90 vol % of an external oil phase;
wherein the invert emulsion drilling fluid is substantially salt-free;
drilling the subterranean formation with the invert emulsion drilling fluid, to form a used invert emulsion drilling fluid comprising drilled cuttings; and
cleaning the used invert emulsion drilling fluid to form a cleaned invert emulsion drilling fluid, the cleaning comprising processing the used invert emulsion drilling fluid in a) a primary separator, b) a thermal separator, or c) both, to remove at least some of the drilled cuttings therefrom.

Embodiment 52 provides a system comprising:
a drill string disposed in a wellbore, the drill string comprising a drill bit at a downhole end of the drill string;
an annulus between the drill string and the wellbore;
a pump configured to circulate an invert emulsion drilling fluid through the drill string, through the drill bit, and back above-surface through the annulus; and
a separator configured to process the invert emulsion drilling fluid from the annulus to remove at least some drilled cuttings therefrom.

Embodiment 53 provides an apparatus comprising:
a) a primary separator, b) a thermal separator, or c) both a) and b), configured to process a used invert emulsion drilling fluid to remove at least some drilled cuttings therefrom.

Embodiment 54 provides the method, system, or apparatus of any one or any combination of Embodiments 1-53 optionally configured such that all elements or options recited are available to use or select from.

What is claimed is:

1. A method of cleaning a used invert emulsion drilling fluid comprising an external oil phase, drilled cuttings, and an internal aqueous phase comprising an alcohol, comprising:
processing the used invert emulsion drilling fluid in a primary separator to remove at least some of the drilled cuttings therefrom to form a primary-separator-cleaned invert emulsion drilling fluid; and
processing the primary-separator-cleaned invert emulsion drilling fluid in a thermal separator, wherein the thermal separator heats the primary-separator-cleaned invert emulsion drilling fluid to evaporate at least some water, alcohol, and oil therein away from dissolved and insoluble solids therein to form evaporated liquid and condenses at least some of the evaporated liquid to form a cleaned water phase, a cleaned alcohol phase, and a cleaned oil phase.

2. The method of claim 1, further comprising processing the drilled cuttings removed in the primary separator in a secondary separator to remove at least some of the used invert emulsion drilling fluid therefrom.

3. The method of claim 2, wherein the secondary separator comprises a fluid recovery unit, a vertical cuttings dryer, or a combination thereof.

4. The method of claim 1, wherein the thermal separator comprises a heating unit and a condensation unit, or a first stage condenser and a second stage condenser.

5. The method of claim 1, further comprising placing the cleaned invert emulsion drilling fluid in a subterranean formation.

6. The method of claim 5, wherein the internal aqueous phase is about 10 vol % to about 50 vol % of the invert emulsion drilling fluid, and wherein the external oil phase is about 50 vol % to about 90 vol % of the invert emulsion drilling fluid.

7. The method of claim 5, wherein the alcohol is at least about 40 wt % of the aqueous phase, wherein the alcohol is glycerol, and wherein the external oil phase comprises at least one of a synthetic oil, a diesel oil, and a mineral oil.

8. The method of claim 1, wherein the invert emulsion drilling fluid comprises an emulsifier, and wherein the emulsifier comprises a hydrophobic amine and an organic acid.

9. The method of claim 8, wherein the organic acid is citric acid.

10. The method of claim 8, wherein the hydrophobic amine has the structure:

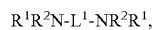

wherein:
at each occurrence $R^1$ and $R^2$ are each independently chosen from —H and substituted or unsubstituted $(C_1-C_{20})$hydrocarbyl; and
$L^1$ is a hydrophobic substituted or unsubstituted $(C_{10}-C_{60})$hydrocarbylene.

11. The method of claim 10, wherein $L^1$ has the structure:

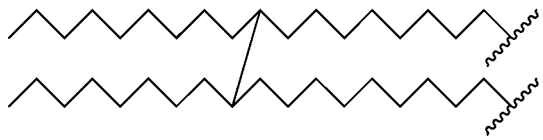

12. The method of claim 8, wherein the hydrophobic amine has the structure:

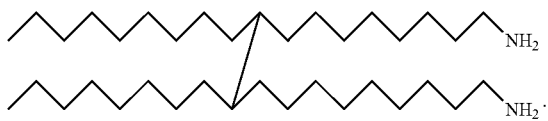 [SMILES: CCCCCCCCCC(CCCCCCCCN)C(CCCCCCCC)CCCCCCCCCN]

13. The method of claim 1, wherein the invert emulsion drilling fluid comprises a suspending agent, and wherein the suspending agent is a polymer formed from a diamine or polyamine and a diisocyanate or polyisocyanate.

14. The method of claim 13, wherein the diamine or polyamine is hydrazine, ethylenediamine, 1,2-propylenediamine, 1,3-propylenediamine, 1-amino-3-methylaminopropane, 1,4-diaminobutane, N,N'-dimethyl-1-ethylenediamine, 1,6-diaminohexane, 1,12-diaminododecane, 2,5-diamino-2,5-dimethylhexane, trimethyl-1,6-hexanediamine, diethylenetriamine, N,N',N''-trimethyldiethylenetriamine, triethylenetetraamine, tetraethylenepentamine, pentaethylenehexamine, polyethyleneimine, dipropylenetriamine, tripropylenetetraamine, bis-(3-aminopropyl)amine, bis-(3-aminopropyl)methylamine, piperazine, 1,4-diaminocyclohexane, isophoronediamine, N-cyclohexyl-1,3-propanediamine, bis-(4-amino-cyclohexyl)methane, bis-(4-amino-3-methylcyclohexyl)-methane, bisaminomethyltricyclodecane (TCDdiamine), o-, m- or p-phenylenediamine, 1,2-diamino-3-methylbenzene, 1,3-diamino-4-methylbenzene(2,4-diaminotoluene), 1,3-bisaminomethyl-4,6-dimethylbenzene, 2,4-diamino-3,5-diethyltoluene, 2,6-diamino-3,5-diethyltoluene, 1,4- diaminonaphthalene, 1,6-diaminonaphthalene, 1,8-diaminonaphthalene, 2,7-diaminonaphthalene, bis-(4-amino-phenyl)-methane, polymethylenepolyphenylamine, 2,2-bis-(4-aminophenyl)-propane, 4,4'-oxybisaniline, 1,4-butanediol bis-(3-aminopropyl ether), 2-(2-aminoethylamino)ethanol, 2,6-diamino-hexanoic acid, liquid polybutadienes or acrylonitrile/butadiene copolymers comprising amino groups, polyethers comprising amino groups, or any combination thereof.

15. The method of claim 13, wherein the diisocyanate or polyisocyanate is at least one of hexamethylenediisocyanate (HDI), toluene-diisocyanate (TDI), 2,2'-diisocyanatodiphenylmethane, 2,4'-diisocyanatodiphenylmethane, 4,4'-diisocyanatodiphenylmethane, polymethylenepolyphenyldiisocyanate (PMDI), naphthalene-diisocyanate (NDI), 1,6-diisocyanato-2,2,4-trimethylhexane, isophoronediisocyanate, (3-isocyanato-methyl)-3,5,5-trimethyl cyclohexyl isocyanate (IPDI), tris(4-isocyanatophenyl)-methane, phosphoric acid tris-(4-isocyanato-phenyl ester), thiophosphoric acid tris-(4-isocyanato-phenyl ester), or any combination thereof.

16. The method of claim 1, further comprising:
treating the cleaned water phase with glycerin; and
recycling the cleaned water phase, the cleaned alcohol phase, and the cleaned oil phase to form a cleaned invert emulsion drilling fluid.

17. A method of treating a subterranean formation, comprising:
placing in the subterranean formation an invert emulsion drilling fluid comprising:
about 0.1 vol % to about 80 vol % internal aqueous phase that comprises a ($C_3$-$C_{30}$)hydrocarbon polyol;
about 20 vol % to about 90 vol % of an external oil phase;
wherein the invert emulsion drilling fluid is substantially salt-free; and
wherein the invert emulsion drilling fluid comprises an emulsifier, and wherein the emulsifier comprises a hydrophobic amine and an organic acid;
drilling the subterranean formation with the invert emulsion drilling fluid, to form a used invert emulsion drilling fluid comprising drilled cuttings; and
processing the used invert emulsion drilling fluid in a primary separator to remove at least some of the drilled cuttings therefrom to form a primary-separator-cleaned invert emulsion drilling fluid; and
processing the primary-separator-cleaned invert emulsion drilling fluid in a thermal separator, wherein the thermal separator heats the primary-separator-cleaned invert emulsion drilling fluid to evaporate at least some water, alcohol, and oil therein away from dissolved and insoluble solids therein to form evaporated liquid and condenses at least some of the evaporated liquid to form a cleaned water phase, a cleaned alcohol phase, and a cleaned oil phase.

18. A method of cleaning a used salt-free invert emulsion drilling fluid comprising an external oil phase, drilled cuttings, and an internal aqueous phase comprising an alcohol, comprising:
processing the used salt-free invert emulsion drilling fluid in a primary separator to remove at least some of the drilled cuttings therefrom to form a primary-separator-cleaned salt-free invert emulsion drilling fluid; and
processing the primary-separator-cleaned salt-free invert emulsion drilling fluid in a thermal separator, wherein the thermal separator heats the primary-separator-cleaned salt-free invert emulsion drilling fluid to evaporate at least some water, alcohol, and oil therein away from dissolved and insoluble solids therein to form evaporated liquid and condenses at least some of the evaporated liquid to form a cleaned water phase, a cleaned alcohol phase, and a cleaned oil phase.

* * * * *